United States Patent [19]

Sakai

[11] Patent Number: 5,060,020
[45] Date of Patent: Oct. 22, 1991

[54] IMAGE RECORDING APPARATUS USING COLORING PHOTOSENSITIVE TONER IN THE FORM OF MICROCAPSULE

[75] Inventor: Jun Sakai, Nagoya, Japan

[73] Assignee: Brother Kogyo Kabushiki Kaisha, Japan

[21] Appl. No.: 577,610

[22] Filed: Sep. 5, 1990

[30] Foreign Application Priority Data

Sep. 6, 1989 [JP] Japan .................................. 1-230732
Oct. 13, 1989 [JP] Japan .................................. 1-266728

[51] Int. Cl.⁵ .............................................. G03G 15/06
[52] U.S. Cl. ....................................... 355/245; 355/27; 355/326; 430/109; 430/138; 430/901
[58] Field of Search .................. 430/138, 109; 355/27, 355/245, 326, 327

[56] References Cited

U.S. PATENT DOCUMENTS

| | | | |
|---|---|---|---|
| 4,865,943 | 9/1989 | Wright | 430/138 |
| 4,878,083 | 10/1989 | Hayakawa et al. | 355/27 |
| 4,884,082 | 11/1989 | Sonoda et al. | 430/138 |
| 4,920,375 | 4/1990 | Akao et al. | 355/27 |
| 4,935,784 | 6/1990 | Shigehiro et al. | 355/245 X |

Primary Examiner—A. T. Grimley
Assistant Examiner—Patrick Stanzione
Attorney, Agent, or Firm—Oliff & Berridge

[57] ABSTRACT

An image recording apparatus uses coloring photosensitive toner for a full-color copying which is in the form of a microcapsule having a shell, a photosensitive resin and a chromogenic material both encapsulated in the shell, and a developer material coated on the outer surface of the shell. To increase the monochromatic copying speed, the apparatus further uses a monochromatic toner. When a user's switch is depressed, a driver unit selects either one of the full-color and monochromatic color copying mode. When the monochromatic image is to be copied, a pressure developing unit which is used for pressure developing a color latent image is retracted, so that a recording medium on which a monochromatic toner image is deposited is free from the pressure imparted by the pressure developing unit and the pressure developing unit is not smeared with the monochromatic toner powders.

5 Claims, 1 Drawing Sheet

IMAGE RECORDING APPARATUS USING COLORING PHOTOSENSITIVE TONER IN THE FORM OF MICROCAPSULE

BACKGROUND OF THE INVENTION

The present invention relates to an image recording apparatus using a coloring photosensitive toner in the form of microcapsule encapsulating a photosensitive resin and a chromogenic material.

Heretofore, there has been known an image recording apparatus which uses a photosensitive toner and a developer toner for image recording. With such an apparatus, the image of the original document can be reproduced in a desired recording medium. For image recording, two kinds of toners are electrostatically deposited on a photosensitive drum and an imaging light is irradiated thereonto to form a latent image thereon. The latent image is developed and the resultant visible image is transferred onto the recording medium.

This apparatus is advantageous in that no substantial color slip is caused and thus a high quality color image can be reproduced in comparison with a conventional apparatus wherein three or four kinds of toner are used.

However, the above-described apparatus uses the photosensitive toner which is low in photo-sensitivity, and besides the same number of steps needs to be taken to reproduce the monochromatic image a the number of steps needed to reproduce the full-color images. Therefore, the same recording time is required for recording the monochromatic images as the time for recording the full-color image. Such a recording apparatus is inconvenient particularly when a number of monochromatic copies are to be made.

SUMMARY OF THE INVENTION

The present invention has been made to solve the above-mentioned problem, and therefore it is an object of the invention to provide an image recording apparatus wherein a monochromatic copying speed is increased relative to a full-color copying speed, so that a number of monochromatic copies can be made at a reduced time in comparison with a conventional apparatus.

To achieve the above and other objects, there is provided an image recording apparatus for recording an image of an original document on a recording medium which comprises a photosensitive drum rotatable about its own axis, exposure means for exposing the photosensitive drum to an imaging light carrying the image of the original document to form a latent image corresponding to the image of the original document, first storage means for storing coloring photosensitive toner in the form of a microcapsule having a shell, a photosensitive resin and a chromogenic material both encapsulated in the shell, and a developer material coated on an outer surface of the shell, wherein the chromogenic material reacts with the developer material and a color is thereby formed, second storage means for storing monochromatic toner containing a coloring agent and a binder, driving means connected to the first and second storage means for activating at least one of the first and second storage means, wherein the toner stored in the activated storage means is deposited on the latent image, and wherein the coloring photosensitive toner deposited thereon is exposed to the imaging light to form a color latent image corresponding to a color image of the original document, pressure developing means for pressure developing the color latent image and providing a visible color image on the recording medium, transferring means for transferring the monochromatic toner deposited on the photosensitive drum onto the recording medium, and fixing means for fixing the image on the recording medium.

In the image recording apparatus thus arranged, when the second storage means is activated by the driver means, the monochromatic image is copied at a higher speed in comparison with the case when the full-color copying is made by activating the first storage means.

The above and other objects, features and advantages of the present invention will become more apparent from the following description when taken in conjunction with the accompanying drawings in which preferred embodiments of the present invention are shown by way of illustrative examples.

DETAILED DESCRIPTION OF THE PREFERRED EMBODIMENTS

Figure 2:
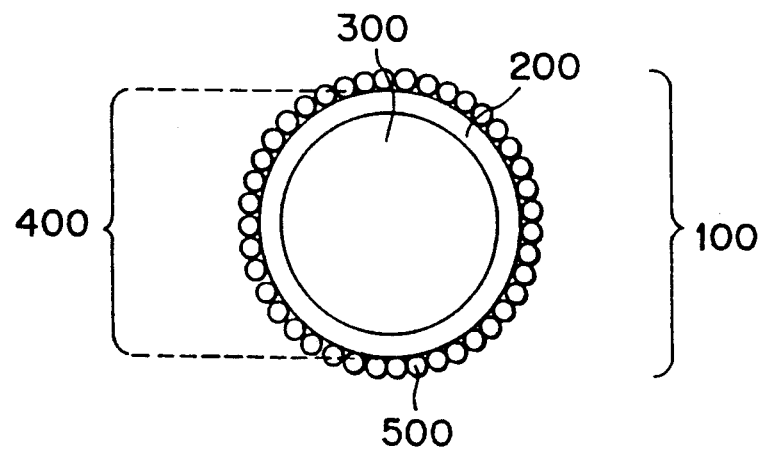
FIG. 2 is an enlarged cross-sectional view showing a coloring photosensitive toner used in the apparatus shown in FIG. 1.

A coloring photosensitive toner is used in an image recording apparatus of the present invention, which will initially be described with reference to FIG. 2. The coloring photosensitive toner 100 is in the form of a microcapsule 400 which comprises a spherically configured shell 200, an inner core 300 confined within the shell 200 and containing a photosensitive resin and a chromogenic material or a color former, and a developer material layer 500 deposited on the outer surface of the shell 200.

The photosensitive toner is sensitive to a light of a particular wavelength and when the light is applied thereto, the viscosity of the photosensitive resin confined within the shell 200 is changed depending upon the intensity of the light applied. With the subsequent application of a pressure to the microcapsule 400, the shell 200 is ruptured and the chromogenic material is released therefrom which then reacts with the developer material 500, whereby a color of magenta, cyan and yellow is formed.

The photosensitive resin may include photodimerizable resin having photosensitive groups such as cinnamic acid group, cinnamylidene group; photolysis type of resin having photosensitive groups such as quinone diazido group, dithiocarbamate group; and a photopolymerizable resin having acryloyl group, allyl group, vinyl group.

The chromogenic material may include inorganic acidic substance such as Japanese acid clay, kaolinite, bentonite; substituted-phenol compounds; phenol resin type compounds; metal salts of the above-mentioned two compounds; aromatic carboxlic compounds; and metal salts of the aromatic carboxlic compounds.

Figure 1:
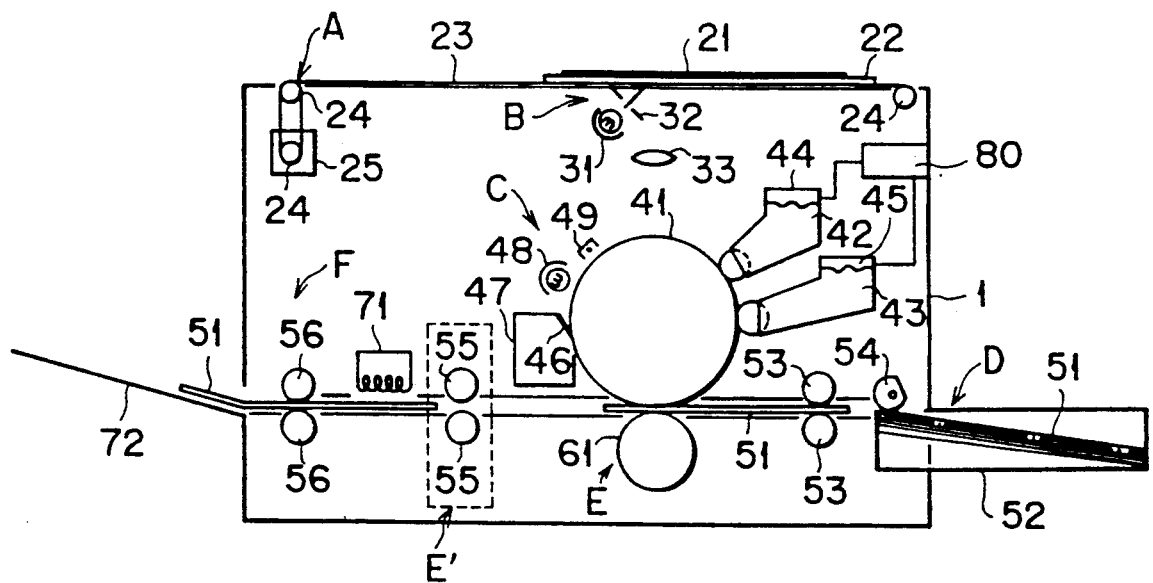
FIG. 1 is a schematic cross-sectional view showing an image recording apparatus according to the present invention.

A preferred embodiment of the present invention will now be described with reference to FIG. 1 which is a schematic cross-sectional view showing an image recording apparatus according to the present invention.

The apparatus 1 is essentially comprised of an original support pane drive system A for driving an original support pane 22 on which an original document 21 is placed face down an exposure system B for exposing a photosensitive drum 41 to an imaging light to form an electrostatic latent image thereon corresponding to the image of the original document 21, a first developing system C for developing the latent image with the coloring photosensitive toner 42 or a monochromatic (black color) toner powders 43, a conveying system D for conveying a recording medium 51, a second developing system E for pressurizing the coloring photosensitive toner 42 to thereby form a color image and transfer it onto the recording medium 51, and a thermal fixing system F for thermally fixing the image formed on the recording medium 51.

More specifically, the original support pane drive system A includes the original support pane 22, a drive wire 23 attached to the original support pane 22, a drive pulley 24, and a drive motor 25. The original support pane 22 is reciprocally movable in accordance with the rotations of the motor 24.

The exposure system B includes a light source 31 for irradiating a light onto the original document 21 through a slit 32, and a focusing lens 33 for receiving the light reflected from the original document 21, i.e., imaging light, and focusing it onto the photosensitive drum 41.

The first developing system C includes the photosensitive drum 41 on which the electrostatic latent image corresponding to the image of the original document 21 is formed, a developing unit 45 for developing the latent image with the monochromatic (black color) toner powders contained therein, a cleaning unit 47 having a cleaning blade 46 for cleaning the residual toner powders which remain on the surface of the photosensitive drum 41, a discharge lamp 48, and a charging corotron 49 for uniformly charging the photosensitive drum 41 to a predetermined polarity.

The conveying system D includes a sheet cassette 52 storing a -stack of recording media 51, a sector roller 54 for feeding the uppermost recording medium 51 out of the sheet cassette 52, and a pair of feed rollers 53 for introducing the recording medium 51 into the second developing system E.

The second developing system E includes the photosensitive drum 41, a developing unit 44 for developing the latent image formed on the photosensitive drum 41 with the coloring photosensitive toner contained therein, and a pressurizing roller 61 for pressurizing the photosensitive toner 42 which is exposed to the imaging light in the second scan of the original document 21 and in which a latent image corresponding to the image of the original document 21 is formed. The latent image is pressure developed by the photosensitive drum 41 and the pressurizing roller 61 and a visible color image is transferred onto the recording medium 51.

The two developing units 44, 45 are connected to a driver unit 80 and one of them are selectively driven in response to a signal fed from the driver unit 80. Also connected to the driver unit 80 is a user's switch (not shown) for selecting one of these two developing units 44, 45. When the monochromatic copying is performed, the pressurizing roller 61 is used as the toner transferring electrode for transferring the monochromatic toner image deposited on the photosensitive drum 41 onto the recording medium 51.

The fixing system F includes a thermal fixing unit 71 for thermally fixing the image transferred on the recording medium 51. The recording medium 51 is discharged onto the discharge tray 72 after the thermal fixing.

Operation of the apparatus thus arranged will be described. Firstly, a full-color recording will be described which is performed when a full-color mode is selected through the user's switch.

The light emanated from the light source 31 is irradiated onto the original document 21 through the slit 32, and a light reflected therefrom is focused on the uniformly precharged photosensitive drum 41 through the lens 33 to thereby form an electrostatic latent image thereon corresponding to the image of the original document 21. The latent image thereon is developed by the coloring photosensitive toner 42 supplied from the developing unit 44 which is actuated in response to the signal fed from the driver unit 80. The photosensitive drum 41 rotates in synchronism with the movement of the original document support pane 22, and one frame of the electrostatic latent image is developed corresponding to the image of the original document 21.

The photosensitive drum 41 returns to a start position with the coloring photosensitive toner 42 deposited thereon. At the same time, the original support pane 22 returns to a start position, whereupon the light from the light source 31 is again irradiated onto the sam original document 21 and the light reflected therefrom is applied to the coloring photosensitive toner deposited on the photosensitive drum 41. An exposure speed or peripheral speed of the drum 41 is set to be slower than the speed at which the electrostatic latent image is formed thereon. When the photosensitive toner 42 is applied with light, the viscosity of the photosensitive resin encapsulated in the shell 200 changes depending upon the amount of exposure, thereby forming a latent image on the coloring photosensitive toner.

The latent image thereon is thereafter pressure developed by the photosensitive drum 41 and the pressurizing roller 61, and the visible color image is transferred onto the recording medium 51. When the pressure development is performed, the recording medium 51 has been fed out from the cassette 52 and brought to a position immediately below the photosensitive drum 41 by the feed rollers 53, 53 which are driven in synchronism with the rotations of the photosensitive drum 41. In this embodiment, the photosensitive drum 41 also serves as a pressurizing roller and imparts a pressure to the recording medium 51 in cooperation with the pressurizing roller 61 only when the same is interposed between the photosensitive drum 41 and the roller 61. The recording medium 51 is passed through a nip between the photosensitive drum 41 and the roller 61 in synchronism with the rotation of the photosensitive drum 41.

When the recording medium 51 passes through the nip therebetween, the coloring photosensitive toner 43 deposited on the photosensitive drum 41 is ruptured by the pressure applied thereto, and the chromogenic material is released from the ruptured microcapsule depending upon the exposure degree. The chromogenic material reacts with the developer material 500 and a color image is developed and transferred onto the recording medium 51. After transferring the image, the surface of the photosensitive drum 41 is cleaned by the cleaning blade 46, discharged by the discharge lamp 48, and then uniformly charged by the charging corotron 49, thereby placing the photosensitive drum 41 in an initial condition.

The image transferred onto the recording medium 51 is thermally fixed by the thermal fixing unit 71 and is then discharged onto the discharge tray 72, whereby the full-color recording is terminated.

Next, operation of the monochromatic copying will be described. The monochromatic copying is performed upon specifying the monochromatic copying mode through the user's switch.

Similar to the full-color copying operation, the light from the light source 31 is irradiated onto the original document 21 through the slit 32, and the light reflected therefrom is applied onto the uniformly precharged photosensitive drum 41 through the focusing lens 33 to thereby form an electrostatic latent image thereon corresponding to the image of the original document. The electrostatic latent image is, at this time, developed by the monochromatic toner 43 contained in the developing unit 45. After the development, the toner image thereon is transferred onto the recording medium 51, whereat the uppermost recording medium stored in the cassette 52 has been fed out by the sector roller 54 and brought to the position immediately below the photosensitive drum by the feed rollers 53.

At the time of monochromatic copying, the pressurizing roller 61 operates as the transferring electrode. If, in this case, the recording medium 51 is passed through the nip between the photosensitive drum 41 and the roller 61, the roller 61 might be smeared with the toner image on the recording medium 51 or the conveyance of the recording medium 51 may not be smoothly performed. Therefore, at the time of monochromatic image transferring, the roller 61 is held in slightly apart from the photosensitive drum 41 and the recording medium 51 is conveyed through the gap between the photosensitive drum 41 and the roller 61 while being in sliding contact with the peripheral surface of the photosensitive drum 41. Due to the roller 61 or the transferring electrode disposed immediately beneath the recording medium 51, the monochromatic toner powders on the photosensitive drum 41 are transferred onto the recording medium 51.

The toner image on the recording medium 51 is thermally fixed by the thermal fixing unit 71, and the recording medium 51 is discharged onto the discharge tray 72. This completes the monochromatic copying operation.

As described above, the number of steps of the monochromatic copying operation is smaller than that of the full-color copying operation, so that the monochromatic copying speed is increased relative to the full-color copying speed.

The monochromatic toner as used herein is the one which is used in a typical electrophotographic copying machine and is essentially comprised of a coloring agent and a thermoplastic binder. The thermoplastic binder includes polystyrene, styrene, acrylic copolymer, polyester, and copolymer of ethylene and vinyl acetate. For the coloring agent, dye or pigment as generally available can be used.

In the above-described embodiment, the image of the original document can be copied to any kind of the recording medium.

While the present invention has been described with reference to a specific embodiment, it would be apparent to those skilled in the art that a variety of changes and modifications may be made without departing from the scope and spirit of the present invention. For example, although the photosensitive drum 41 is used not only for forming a latent image corresponding to the image of the original document 21 but also for pressure developing the exposed photosensitive toner, a pressure developing unit E' including two rollers 55, 55 held in confronting relation may be provided in downstream of the photosensitive drum 41 as shown in FIG. 1. In such a modification, the exposed photosensitive toner on the photosensitive drum 41 is transferred onto the recording medium 51 with the use of a transfer corotron disposed in place of the roller 61, and the recording medium 51 is subjected to pressure development by the pressure developing unit E' to provide the visible image thereon. On the other hand, when the monochromatic copying is performed, the rollers 55, 55 are held in spaced apart, so that the toner image on the recording medium 51 is not offset on the upper roller 55 and the conveying speed of the recording medium 51 is not decreased.

Further, while description has been given in which the full-color and monochromatic color copings are effected on separate recording media, both the full-color and monochromatic images can be copied on the same recording medium.

What is claimed is:

1. An image recording apparatus for recording an image of an original document on a recording medium, comprising:

a photosensitive drum rotatable about its own axis;

exposure means for exposing said photosensitive drum to an imaging light carrying the image of the original document to form a latent image corresponding to the image of the original document;

first storage means for storing coloring photosensitive toner in the form of a microcapsule having a shell, a photosensitive resin and a chromogenic material both encapsulated in said shell, and a developer material coated on an outer surface of said shell, wherein the chromogenic material reacts with the developer material and a color is thereby formed;

second storage means for storing monochromatic toner containing a coloring agent and a binder;

driving means connected to said first and second storage means for activating at least one of said first and second storage means, wherein the toner stored in the activated storage means is deposited on the latent image, and wherein the coloring photosensitive toner deposited thereon is exposed to the imaging light to form a color latent image corresponding to a color image of the original document;

pressure developing means for pressure developing the color latent image and providing a visible color image on the recording medium;

transferring means for transferring the monochromatic toner deposited on said photosensitive drum onto the recording medium; and fixing means for fixing the image on the recording medium.

2. An image recording apparatus according to claim 1, wherein the recording medium is fed between said photosensitive drum and said pressure developing means and imparted with a pressure by said pressure developing means against said photosensitive drum when the color latent image is pressure developed.

3. An image recording apparatus according to claim 2, wherein the recording medium is free from the pressure by said pressure developing means when the monochromatic latent image is transferred onto the recording medium by said transferring means.

4. An image recording apparatus according to claim 1, wherein said pressure developing means comprises a pair of rollers disposed in downstream of said photosensitive drum with respect to a direction in which the recording medium is fed, the recording medium being fed into a nip between said pair of rollers when the color latent image is developed.

5. An image recording apparatus according to claim 4, wherein said pair of rollers are held in spaced apart to have a gap therebetween when said second storage means is activated by said driving means.

* * * * *